United States Patent
Winkler et al.

(10) Patent No.: US 12,436,059 B2
(45) Date of Patent: Oct. 7, 2025

(54) MONITORING AND MEASURING DEVICE, AND METHOD FOR MONITORING AND FOR MEASURING PARAMETERS OF AN AIR SUPPLY SYSTEM OF VEHICLES, IN PARTICULAR RAIL VEHICLES

(71) Applicant: KNORR-BREMSE SYSTEME FÜR SCHIENENFAHRZEUGE GMBH, Munich (DE)

(72) Inventors: Michael Winkler, Munich (DE); Anouar Gmati, Munich (DE); Marc-Oliver Herden, Munich (DE); Martin Linner, Schwindegg (DE); Martin Schmid, Munich (DE); Alexander Kirmayr, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 325 days.

(21) Appl. No.: 18/021,102

(22) PCT Filed: Jul. 28, 2021

(86) PCT No.: PCT/EP2021/071213
§ 371 (c)(1),
(2) Date: Feb. 13, 2023

(87) PCT Pub. No.: WO2022/033880
PCT Pub. Date: Feb. 17, 2022

(65) Prior Publication Data
US 2023/0324252 A1    Oct. 12, 2023

(30) Foreign Application Priority Data
Aug. 11, 2020  (DE) ................. 10 2020 210 176.0

(51) Int. Cl.
*G01M 3/26* (2006.01)
*B60T 17/22* (2006.01)
(Continued)

(52) U.S. Cl.
CPC ............. *G01M 3/26* (2013.01); *B60T 17/228* (2013.01); *B61L 15/0081* (2013.01);
(Continued)

(58) Field of Classification Search
CPC ..... G01M 3/00; G01M 3/26–28; B60T 17/00; B60T 17/004; B60T 17/22; B60T 17/228;
(Continued)

(56) References Cited

U.S. PATENT DOCUMENTS

| | | | |
|---|---|---|---|
| 3,696,588 A * | 10/1972 | Dussourd | B60T 17/004 96/113 |
| 5,103,576 A | 4/1992 | Cramer et al. | |
| 2020/0033224 A1 * | 1/2020 | Walters | B60T 13/686 |

FOREIGN PATENT DOCUMENTS

| | | | | |
|---|---|---|---|---|
| DE | 10135361 A1 * | 2/2003 | | B60G 17/015 |
| DE | 102014018437 A1 | 6/2016 | | |

(Continued)

OTHER PUBLICATIONS

DE-10135361-A1 Machine Translation (Year: 2003).*
International Search Report and Written Opinion corresponding to PCT/EP2021/071213 dated Nov. 5, 2021.

*Primary Examiner* — Nguyen Q. Ha
(74) *Attorney, Agent, or Firm* — Barnes & Thornburg LLP

(57) ABSTRACT

A monitoring and measuring device for an air supply system of a vehicle, in particular a rail vehicle, includes a compressor which is designed to provide compressed air; a defined volume which is situated downstream of the compressor; a shut-off valve which is situated downstream of the defined
(Continued)

volume; a pressure sensor which is provided at any desired position on the pressure line between the compressor and the shut-off valve and is configured to measure the pressure that builds in the defined volume. A first or second air drying device, for example, is used as the defined volume. The pressure curve measured by the pressure sensor can indicate whether there is a fault or a leak. A method for monitoring and for measuring parameters of an air supply system of a vehicle, in particular a rail vehicle is also provided.

8 Claims, 2 Drawing Sheets

(51) Int. Cl.
*B61L 15/00* (2006.01)
*F16D 66/00* (2006.01)
*B60T 17/00* (2006.01)

(52) U.S. Cl.
CPC ............ *F16D 66/00* (2013.01); *B60T 17/004* (2013.01); *B60T 2270/88* (2013.01); *F16D 2066/005* (2013.01)

(58) Field of Classification Search
CPC .. B60T 2270/88; B61L 15/0081; F16D 66/00; F16D 2066/005
See application file for complete search history.

(56) References Cited

FOREIGN PATENT DOCUMENTS

| | | |
|---|---|---|
| EP | 0009139 A1 | 4/1980 |
| EP | 0263669 A2 | 4/1988 |
| EP | 0523194 B1 | 10/1994 |
| EP | 3230136 B1 | 9/2020 |
| JP | S5535996 A | 3/1980 |
| JP | 2007223589 A | 9/2007 |
| JP | 2011149758 A | 8/2011 |

* cited by examiner

MONITORING AND MEASURING DEVICE, AND METHOD FOR MONITORING AND FOR MEASURING PARAMETERS OF AN AIR SUPPLY SYSTEM OF VEHICLES, IN PARTICULAR RAIL VEHICLES

CROSS REFERENCE AND PRIORITY CLAIM

This patent application is a U.S. National Phase of International Patent Application No. PCT/EP2021/071213 filed Jul. 28, 2021, which claims priority to German Patent Application No. 10 2020 210 176.0, the disclosure of which being incorporated herein by reference in their entireties.

FIELD

Disclosed embodiments relate to a monitoring and measuring device and to a method for monitoring and measuring parameters of an air supply system of a vehicle, in particular a rail vehicle.

BACKGROUND

Air supply systems in rail vehicles include various containers and tanks, compressors, drying devices, valves, lines and other fittings. The air supply in rail vehicles is particularly important for supplying compressed air to the braking system.

Faults and damage in air supply systems, such as leaks, wear of piston rings, valve fractures or other defects, usually lead to a reduction in the delivery capacity of the air supply system, but not immediately to total failure.

Such faults are usually not noticed immediately, and, therefore, the defective system may continue to be operated, which can cause serious consequential damage such as brake system failures or disproportionate wear.

SUMMARY

A monitoring and measuring device according to disclosed embodiments for an air supply system of a vehicle, in particular a rail vehicle, comprises: a compressor, which is adapted to provide compressed air, a defined volume, which is arranged downstream of the compressor, and a shut-off valve, which in turn is arranged downstream of the defined volume and is configured to shut off the defined volume, so that no air can escape, or to open it, so that a pressure exchange with the environment or further vehicle components can take place. The monitoring and measuring device according to disclosed embodiments further comprises a pressure sensor, which is provided at any position on the pressure line between the compressor and the shut-off valve and is configured to measure the pressure that builds up in the defined volume.

BRIEF DESCRIPTION OF THE FIGURES

In the following, disclosed embodiments are explained in greater detail with the aid of the accompanying figures.

DETAILED DESCRIPTION

Figure 1:
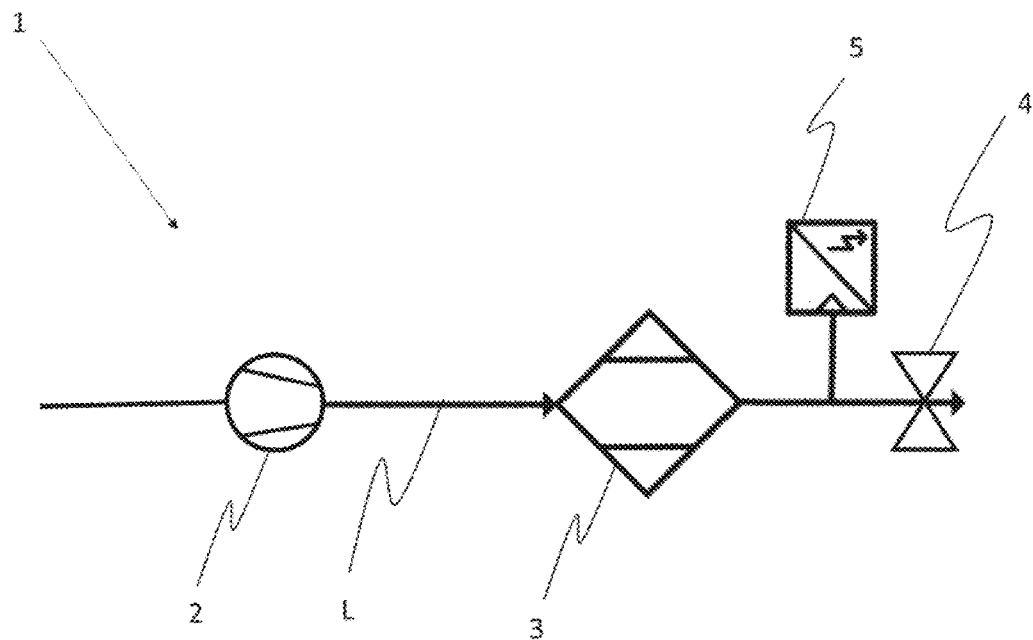
FIG. 1 is a circuit diagram according to a first disclosed embodiment.

In the prior art, monitoring systems for pneumatic systems of rail vehicles are known, in which pressures can be measured at various points. Such monitoring systems are, therefore, either equipped with expensive or complex measuring devices, which directly measure the volumetric flow rate of air quantities transported in lines, or an attempt is made to make a statement about the delivery capacity of the air supply system with the aid of filling times of the components of the entire vehicle. Here, however, the problem arises that the entire vehicle must be brought into a defined operating state, the tank pressure must be known accordingly, and all consumers must be switched off, which is difficult to achieve in reality.

Another problem is that locomotive-hauled trains (such as passenger cars, freight cars with corresponding locomotives) or modern traction units are coupled and decoupled as required, so that different total volumes of components of the air supply system are present. For a determination of the delivery capacity of a compressor as well as the detection of leaks and other errors according to prior art methods, a changing total volume would have to be considered, which would be very complex to measure and which could easily lead to errors.

Disclosed embodiments provide a reliable and easy-to-implement monitoring and measuring device for the functionality of the air supply system of a rail vehicle as well as a corresponding method.

A monitoring and measuring device according to disclosed embodiments for an air supply system of a vehicle, in particular a rail vehicle, comprises: a compressor, which is adapted to provide compressed air, a defined volume, which is arranged downstream of the compressor, and a shut-off valve, which in turn is arranged downstream of the defined volume and is configured to shut off the defined volume, so that no air can escape, or to open it, so that a pressure exchange with the environment or further vehicle components can take place. The monitoring and measuring device according to the disclosed embodiments further comprises a pressure sensor, which is provided at any position on the pressure line between the compressor and the shut-off valve and is configured to measure the pressure that builds up in the defined volume.

Compared with pressure measurements in the entire system, which is very complex and to which many consumers are connected, a relatively simple and reliable monitoring can be selected according to disclosed embodiments, which can be carried out above all regularly and also automatically. Only one pressure sensor is required for this purpose. The pressure change during the filling time is, thus, measured in a relatively small but clearly defined volume within the air supply system. The defined volume also does not change and remains constant for further calculations. This measurement is, therefore, independent of any consumers connected to the air supply system.

Optionally, the monitoring and measuring device further comprises a computing unit which is adapted to determine a pressure change over a filling time in the defined volume based on the signal of the pressure sensor, which can be realized very easily and economically.

Further optionally, the computing unit is adapted to determine a volumetric flow rate of the air flow flowing into the defined volume.

According to disclosed embodiments, no special volumetric flow rate sensor is required for volumetric flow rate measurement, but the volumetric flow rate is simply calculated with the aid of the pressure change in the defined volume over time. A pressure sensor is sufficient for this purpose.

Due to the pressure building up over time in the defined volume, the volumetric flow rate can be determined mathematically. If there were to be a leak in the air supply system, there would be losses in the volumetric flow rate, as the delivery capacity would be reduced.

The total volumetric flow rate is the difference of the air volume which flows into the defined volume divided by the time in which compressed air is filled. The change in pressure build-up, i.e., the pressure change, is, thus, directly related to the volumetric flow rate and the pressure change results from the quotient of the measured pressure difference over time. The volumetric flow rate can then be calculated using the measured pressure change. No defined vehicle condition needs to be established for this (for example, the shutdown of any consumers of compressed air), and no complicated measuring equipment is required to measure the delivery capacity, i.e., volume flows—the volumetric flow rate can, therefore, be determined mathematically.

Further optionally, the computing unit is further configured to output an alarm signal in response to the instantaneous pressure change not being within a predetermined range or the pressure changing non-linearly, for example, drops abruptly or rises non-linearly. Since the primary function of an air supply system is to deliver compressed air in sufficient quantity, a fault would directly affect the delivery capacity, but can be identified by the system according to the disclosed embodiments. The diagnostic capability and a possibility to avoid consequentially severe faults can, thus, be increased considerably and additional testing and measuring effort on the vehicle is not necessary or can be automated well.

Further, optionally, the predetermined volume is the volume of an air drying device. This is suitable to be used as a defined volume, since the volume of air drying devices is known and furthermore independent of the instantaneous consumption of the consumers in the system (for example brakes, air conditioning). This is because the air drying device is basically separated from the rest of the pneumatic system of the train by means of valves. Thus, a clearly defined volume is available.

Since in practice several air drying devices are used in parallel, in a further disclosed embodiment a first air drying device and a second air drying device are selectively connectable to the compressor by a switching valve, and both air drying devices can act as a defined volume. Then, a first valve is provided downstream of the first air drying device, a first pressure sensor is provided between the switching valve and the first valve (which is adapted to measure the pressure in the first air drying device), and a second valve is provided downstream of the second air drying device, and a second pressure sensor is provided between the switching valve of the second valve (which is configured to measure the pressure in the second air drying device).

Since a known volume and a known output pressure can be defined for both air drying devices, this pressure measurement can be easily integrated into the existing system of an air drying plant.

Further optionally, the first valve and the second valve (for the case in which only one valve is present, only the first valve) are overflow valves which allow an air flow to pass from the range of a preset target pressure.

A major advantage is the ease of execution of the system, and with one or two pressure sensor(s), simple and reliable monitoring can be performed on a regular and automated basis. The air drying device or air drying devices are isolated from the rest of the pneumatic system of the train by these overflow valves, but when a certain set pressure is reached, these valves open and the connection to the vehicle is established—and the measurement of the pressure change can be automatically terminated. Thus, an internal pressure build-up can be measured at the level of the set pressure of the overflow valve, and, until this is reached, there is always a closed and always constant volume. This saves time, since no separate container has to be filled with compressed air, but the air drying device or both air drying devices can be used for this purpose.

A method according to disclosed embodiments for monitoring an air supply system and for measuring parameters of an air supply system of a vehicle, in particular rail vehicle, comprises:
a) measuring the pressure in a defined volume using a pressure sensor;
b) pumping compressed air provided by a compressor into the defined volume;
c) determining a pressure change ($\Delta p$) in the defined volume over a filling time ($\Delta tFüll$);
d) checking whether the pressure change ($\Delta p$) has a predetermined, optionally linear, course.

A sudden change in the pressure change (i.e., for example, no linear course of the pressure increase or even a pressure drop) indicates a leak, a valve fault or piston ring wear. This anomaly is then immediately apparent and can be reported as a fault.

Therefore, optionally in the method, operation e) may be further provided, in which an alarm signal is output in response to no linear course of the pressure change or the volumetric flow rate is determined in operation d).

Optionally, in a method according to disclosed embodiments, the volume of an air drying device is the defined volume, and, thus, the measurement method can be easily integrated in a delimited part of the air supply system, and this system is independent of any consumers.

The method could also be used to measure the numerical value of the delivery capacity of compressor 2.

Optionally, a volumetric flow rate of the air flowing into the defined volume is also determined. This can be done with at least one pressure sensor only, one or more volumetric flow rate sensor(s) are not required for this.

FIG. 1 shows a monitoring and measuring device 1 according to disclosed embodiments. The air supply system includes a compressor 2, which is connected to a defined volume 3 by a pressure line L.

Downstream of the defined volume 3, there is provided a pressure sensor 5, and still further downstream, there is provided a shut-off valve 4.

The compressor 2, therefore, now conveys air through the pressure line L into the defined volume 3, and the outlet of the defined volume 3 is closed by the shut-off valve 4. The pressure sensor 5 records the pressure in the entire system over time. With the help of the change in pressure over time, it can be determined whether there is a leak or not, and in addition a volumetric flow rate of compressed air is measured by the pressure sensor 5 measuring the pressure build-up in the defined volume 3 over time. The measured change in pressure build-up is directly related to the volumetric flow rate, which can be calculated from this. The pressure change results from the quotient of a defined pressure difference $\Delta p$ over the filling time $\Delta tFüll$. If the pressure change is not continuously linear and possibly does not correspond to a previously determined and stored course or fluctuates, a leak can be concluded.

Figure 2:
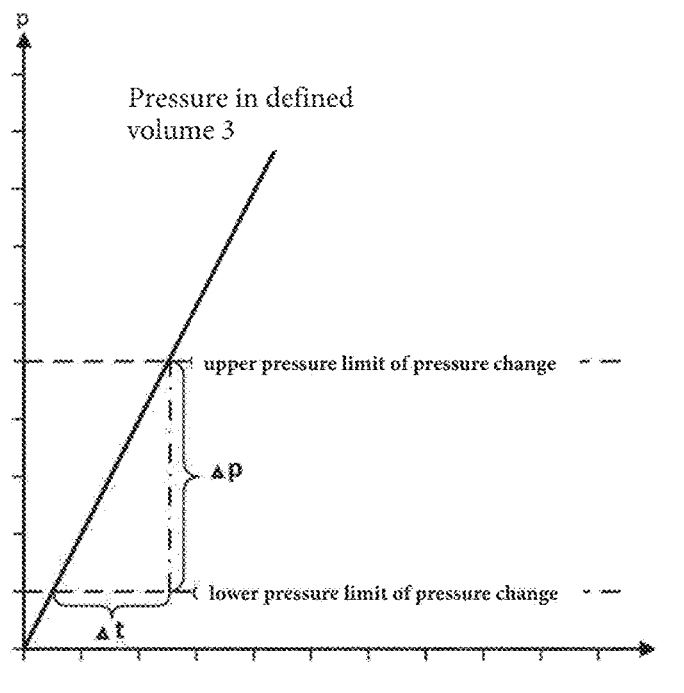
FIG. 2 is a graph showing the pressure course in the defined volume over time.

In FIG. 2, a pressure in the defined volume 3 is plotted over time t. If the pressure course is linear, the pressure increases linearly between the lower pressure limit and the upper pressure limit, the pressure difference Δp can then be measured over the filling time ΔtFüll.

Figure 3:
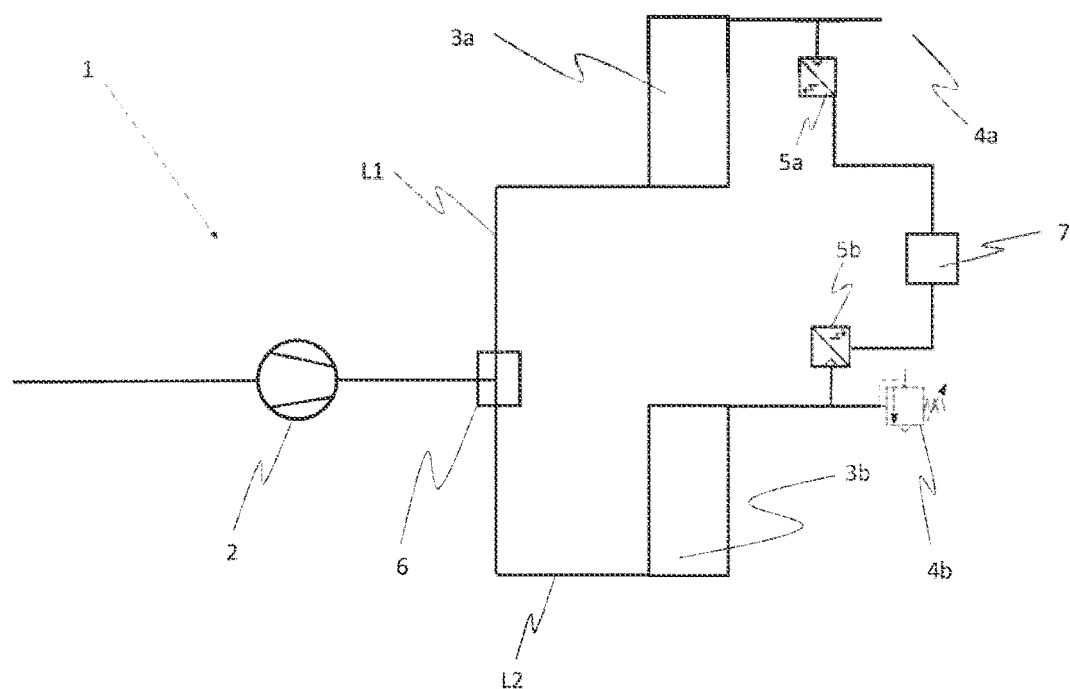
FIG. 3 is a circuit diagram according to a second embodiment.

FIG. 3 shows a circuit diagram of a second embodiment of the disclosed embodiments. Here, the defined volume is divided into two air drying devices 3a and 3b. Air from the compressor 2 is directed to a switching valve 6, which can switch between the first air drying device 3a and the second air drying device 3b or their corresponding pressure lines L1 and L2. Downstream of the first air drying device 3a and the second air drying device 3b, there are arranged a first pressure sensor 5a and a second pressure sensor 5b, respectively. Then, downstream of each of the pressure sensors 5a and 5b, there is an overflow valve 4a and 4b, respectively, which opens at a set pressure value and can discharge air to consumers. In other words, the connection to the vehicle is not established until a certain set pressure is reached. However, until the internal pressure build-up at the level of the set pressure of the overflow valves is reached, there is a closed and always constant volume.

Thus, whichever air drying device 3a or 3b is currently being used is used as the defined volume 3. The compressor 2 supplies air and the first pressure sensor 5a or the second pressure sensor 5b record a pressure curve. Only when the predetermined set pressure of the valves 4a and 4b is reached do these valves open and the measurement is completed.

The measured pressure values of the first pressure sensor 5a and the second pressure sensor 5b are forwarded to a computing unit 7.

When the compressor 2 is switched off, the air drying devices 3a and 3b are completely vented—also the air drying device 3a or 3b which is currently not in operation and is being regenerated. The venting ensures that the same initial pressure is always present, and, thus, the volume and the initial pressure are always known for a reliable measurement.

Since the switching on of the air supply system as well as a switching between the air drying devices 3a and 3b takes place regularly, the evaluation of the pressure change can take place regularly and, above all, in automated fashion.

LIST OF REFERENCE SIGNS 1 monitoring and measuring device
2 compressor
3 defined volume
3a first air drying device
3b second air drying device
4 valve
4a first valve
4b second valve
5 pressure sensor
5a first pressure sensor
5b second pressure sensor
6 switching valve
7 computing unit
ΔtFüll filling time for defined volume
L, L1, L2 pressure line
L air supply system

The invention claimed is:

1. A monitoring and measuring device for an air supply system of a vehicle, the device comprising:
a compressor adapted to provide compressed air;
a defined volume arranged downstream of the compressor to receive the compressed air from the compressor,
a shut-off valve arranged downstream of the defined volume to shut off air flow out of the defined volume, wherein the shut-off valve is an overflow valve designed to open as soon as a preset target pressure is reached,
a pressure sensor provided at any position on a pressure line between the compressor and the shut-off valve and configured to measure a pressure that builds up in the defined volume, and
a computing unit adapted to determine a pressure change over a filling time in the defined volume based on the signal indicating the pressure measured by the pressure sensor.

2. The monitoring and measuring device of claim 1, wherein the computing unit is further adapted to determine a volumetric flow rate of the air flow flowing into the defined volume.

3. The monitoring and measuring device of claim 1, wherein the computing unit is further configured to output an alarm signal in response to the instantaneous pressure change not being within a predetermined range or in response to the pressure changing non-linearly.

4. The monitoring and measuring device of claim 1, wherein the predetermined volume is the volume of an air drying device.

5. The monitoring and measuring device of claim 1, wherein a first air drying device or second air drying device is selectively connectable to the compressor by a switching valve and acts as a defined volume, wherein a first valve is provided downstream of the first air drying device, and a first pressure sensor is provided between the switching valve and the first valve, and a second valve is provided downstream of the second air drying device, and a second pressure sensor is provided between the switching valve and the second valve.

6. A method for monitoring and measuring parameters of an air supply system of a vehicle, in particular a rail vehicle, comprising:
measuring the pressure in a defined volume using a pressure sensor;
pumping compressed air provided by a compressor into the defined volume;
determining a pressure change in the defined volume over a filling time; and
checking whether the pressure change has a predetermined, linear course,
wherein the defined volume is an air drying device of a rail vehicle.

7. The method of claim 6, further comprising:
outputting an alarm signal in response to no predetermined or linear course of the pressure change being determined by the checking of whether the pressure change has a predetermined, linear course.

8. The method of claim 6, further comprising determining a volumetric flow rate of the air flow flowing into the defined volume.

* * * * *